(12) United States Patent
Soares et al.

(10) Patent No.: US 11,332,189 B2
(45) Date of Patent: May 17, 2022

(54) STEERING ASSEMBLY WITH SLIDING MIDDLE LINK

(71) Applicant: LES MOTEURS NORDRESA INC., Laval (CA)

(72) Inventors: Jason Soares, Montreal (CA); Ali Idrici, Laval (CA); Philippe Louisseize, Saint-Joseph-du-Lac (CA); Marc-Antoine Beaudoin, Montreal (CA)

(73) Assignee: LES MOTEURS NORDRESA INC., Laval (CA)

( * ) Notice: Subject to any disclaimer, the term of this patent is extended or adjusted under 35 U.S.C. 154(b) by 0 days.

(21) Appl. No.: 16/944,041

(22) Filed: Jul. 30, 2020

(65) Prior Publication Data
US 2022/0032999 A1    Feb. 3, 2022

(51) Int. Cl.
| | | |
|---|---|---|
| *B62D 7/20* | (2006.01) | |
| *B62D 7/16* | (2006.01) | |
| *B62D 5/06* | (2006.01) | |
| *B62D 1/04* | (2006.01) | |
| *B62D 1/16* | (2006.01) | |

(52) U.S. Cl.
CPC .............. *B62D 7/20* (2013.01); *B62D 7/163* (2013.01); *B62D 7/166* (2013.01); *B62D 1/04* (2013.01); *B62D 1/16* (2013.01); *B62D 5/062* (2013.01)

(58) Field of Classification Search
CPC .......... B62D 7/20; B62D 7/163; B62D 7/166; B62D 7/16; B62D 1/04
See application file for complete search history.

(56) References Cited

U.S. PATENT DOCUMENTS

| | | | | |
|---|---|---|---|---|
| 1,742,782 | A | * | 1/1930 | Parker ...................... B62D 7/16 403/74 |
| 2,789,234 | A | | 4/1957 | Lambert et al. |
| 3,763,951 | A | * | 10/1973 | Kristof ................... B62D 5/083 180/437 |
| 4,555,096 | A | | 11/1985 | Pryor |
| 6,086,075 | A | * | 7/2000 | O'Bryan .................. B62D 7/22 280/89.12 |

(Continued)

FOREIGN PATENT DOCUMENTS

| | | | | |
|---|---|---|---|---|
| CN | 111017019 A | * | 4/2020 | |
| DE | 19526453 C1 | * | 11/1996 | ............... B62D 7/06 |

(Continued)

OTHER PUBLICATIONS

'Machine Translation of KR 200231004 Y1 Obtained Sep. 9, 2021', Jul. 19, 2001, Entire Document. (Year: 2001).*

(Continued)

*Primary Examiner* — Jonathan Ng
*Assistant Examiner* — Scott F. Underwood
(74) *Attorney, Agent, or Firm* — McCoy Russell LLP (57) ABSTRACT

Methods and systems are provided for a steering system for a vehicle. In one example, the steering system may include a steering assembly with a first linkage assembly extending along a first direction between a vehicle steering wheel and a first wheel plate of the steering assembly. The steering system may also include a second linkage assembly with a sliding middle link extending along a second direction between the first wheel plate and a second wheel plate of the steering assembly.

20 Claims, 7 Drawing Sheets

(56) References Cited

U.S. PATENT DOCUMENTS

| | | | |
|---|---|---|---|
| 6,283,483 B1* | 9/2001 | Johnson | B62D 7/09 280/5.522 |
| 6,612,394 B2 | 9/2003 | Wessman | |
| 6,851,688 B2* | 2/2005 | Barry | B62D 7/16 280/93.51 |
| 6,932,148 B1 | 8/2005 | Brummett et al. | |
| 8,011,341 B2* | 9/2011 | Iida | F01M 11/0004 123/195 R |
| 9,937,781 B1 | 4/2018 | Bryer et al. | |
| 2003/0214110 A1* | 11/2003 | Diener | B62D 7/16 280/93.51 |
| 2004/0016589 A1* | 1/2004 | Ulschmid | B62D 7/1527 180/408 |
| 2004/0169374 A1 | 9/2004 | Wurtele et al. | |
| 2010/0117318 A1* | 5/2010 | Grozev | B60G 17/0523 280/124.16 |
| 2015/0191070 A1 | 7/2015 | Raymond | |
| 2017/0106904 A1 | 4/2017 | Hanson et al. | |
| 2019/0291556 A1 | 9/2019 | Caliskan et al. | |
| 2020/0017142 A1* | 1/2020 | Buchwitz | B60G 3/202 |
| 2020/0283064 A1* | 9/2020 | Boyle | B60W 10/08 |

FOREIGN PATENT DOCUMENTS

| | | | | |
|---|---|---|---|---|
| DE | 202014101670 U1 | | 7/2014 | |
| JP | 2005014773 A | * | 1/2005 | |
| KR | 19980028515 U | * | 8/1998 | |
| KR | 19980028532 U | * | 8/1998 | |
| KR | 19980076063 A | * | 11/1998 | |
| KR | 200202988 Y1 | * | 12/2000 | |
| KR | 200231004 Y1 | * | 7/2001 | |
| KR | 200292104 Y1 | * | 10/2002 | |
| KR | 20020080983 A | * | 10/2002 | |
| KR | 20180116814 A | * | 10/2018 | |
| WO | WO-2020111997 A1 | * | 6/2020 | ........... B62D 5/0418 |

OTHER PUBLICATIONS

Mosler et al., 'Machine Translation of DE 19526453 C1 Obtained Sep. 10, 2021', Nov. 14, 1996, Entire Document. (Year: 1996).*

"Car Suspensions," ESF Stream Engineering Lab Website, Available Online at https://esfstream.com/update-atrc-truck/car-suspensions/, Available as Early as Jan. 2019, 2 pages.

* cited by examiner

STEERING ASSEMBLY WITH SLIDING MIDDLE LINK

FIELD

The present description relates generally to methods and systems for a vehicle steering assembly.

BACKGROUND AND SUMMARY

A heavy-duty vehicle may utilize a hydraulic steering gear for steering assistance. The hydraulic steering gear may be coupled to a parallelogram steering system which allows use of rigid axles in the vehicle by enabling independent movement of the vehicle wheels. While the parallelogram steering system is less responsive and more complex than, for example, a rack and pinion steering assembly which may be found in more modern, lighter-duty vehicles, the parallelogram steering system may provide increased passenger comfort in larger vehicles and maintain wheel alignment over longer durations of time. Furthermore, the rack and pinion steering assembly may not be readily adapted to the heavy-duty vehicle with hydraulic power steering due to a lack of a commercially available rack compatible for heavy-duty use.

The heavy-duty vehicle may be configured with rear-wheel drive to enhance initial acceleration and increase traction. However, in instances where motorizing the front wheels is desired, e.g., adapting the heavy-duty vehicle with front-wheel, drive all-wheel, or four-wheel drive, the parallelogram steering system may not provide sufficient packaging space to allow a motorized front drive shaft to be incorporated. For example, the parallelogram steering system may be coupled to a vehicle suspension system, causing components of the steering system to move through sweeping, vertical arcs. Such motion may impart the parallelogram steering system with a large footprint which, in addition to a low engine position in the vehicle, may inhibit incorporation of parts to provide power to the vehicle front wheels.

In one example, the issues described above may be addressed by a steering assembly for a vehicle, comprising a first linkage assembly extending along a first direction between a steering wheel of the vehicle and a first wheel plate of the steering assembly, a second linkage assembly extending along a second direction, perpendicular to the first direction, between the first wheel plate and a second wheel plate of the steering assembly, the second linkage assembly including a sliding middle link coupled to the first wheel plate and the second wheel plate via tie rods at either end of the sliding middle link. A number of moving components and an overall footprint of the steering assembly may be reduced relative to a parallelogram steering system, enabling motorization of front wheels of the vehicle.

As one example, the steering assembly may be coupled to a hydraulic gearbox to provide steering assistance via power steering. The steering assembly may be configured to translate rotation from a steering wheel into linear motion along a horizontal direction, thereby reducing vertical motion of the steering assembly. Furthermore, the steering assembly may be used with non-rigid drive axles and independent suspension systems, such as double wishbone suspensions, thereby offering greater adaptability and flexibility than the parallelogram steering system but without relying on a rack, as demanded by a rack and pinion steering system. By adapting the steering assembly with the sliding middle link, a likelihood of bump steer, a complexity, and a weight of the steering assembly may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A-7 are shown approximately to scale.

DETAILED DESCRIPTION

The following description relates to systems and methods for a vehicle steering system. To control navigation of a vehicle, the vehicle steering system may have a steering assembly coupled to a steering column of a steering wheel, as shown in a simplified diagram in FIG. 1. The steering assembly may transfer rotational motion of the steering wheel into linear motion that drives turning of the vehicle front wheels via various components of the steering assembly. In one example, the components include a sliding middle link, as shown in FIG. 2A, extending between the front wheels of the vehicle. The steering assembly may be coupled to a hydraulic steering gearbox of the vehicle, as shown in an expanded view in FIG. 2B. By adapting the steering assembly with the sliding middle link, a footprint of the steering assembly may be reduced relative to conventional steering systems for heavy-duty, rear-wheel drive vehicles, such as a parallelogram steering assembly. The steering assembly, as described herein, may allow for motorization of the front wheels which may be otherwise precluded in the parallelogram steering assembly. The steering assembly of FIG. 2A is shown separately and in greater detail in FIG. 3. A top view and a rear view of the steering assembly, coupled to the vehicle front wheels, are illustrated in FIGS. 4 and 5, respectively, along with a portion of an independent suspension system. An outer housing of the sliding middle link of the steering assembly is omitted in FIGS. 4 and 5 for clarity. The steering assembly is depicted in a first position, with the front wheels turned to a first direction, in FIG. 6 and in a second position, with the front wheels turned to a second, opposite direction, in FIG. 7.

A steering system of a vehicle enables a driver to control vehicle navigation. A configuration of the steering system may, in some examples, be specifically adapted to a particular drive train of the vehicle, e.g., rear-wheel drive, front-wheel drive, all-wheel drive, etc. For example, a heavy duty vehicle, such as a truck, may have rear-wheel drive and a parallelogram steering assembly to control a direction of vehicle travel. The parallelogram steering assembly, however, may not enable modification of the vehicle to front-wheel drive, however, due to packaging constraints imposed by a geometry and footprint of the parallelogram steering assembly. Furthermore, the parallelogram steering assembly may lack flexibility with regards to compatibility with non-rigid axles and different types of vehicle suspensions.

By configuring the vehicle with a steering assembly as depicted in FIGS. 2A-7 and described further below, the issues described above may at least be partially addressed. The steering assembly may offer a compact, low cost alternative to conventional steering assemblies for heavy-duty vehicles. In addition, the steering assembly may provide greater compatibility with variations in vehicle components, such as different drive trains, axles, suspensions, etc. Details of the steering assembly are provided further below following a general description of a vehicle steering system.

Figure 1:
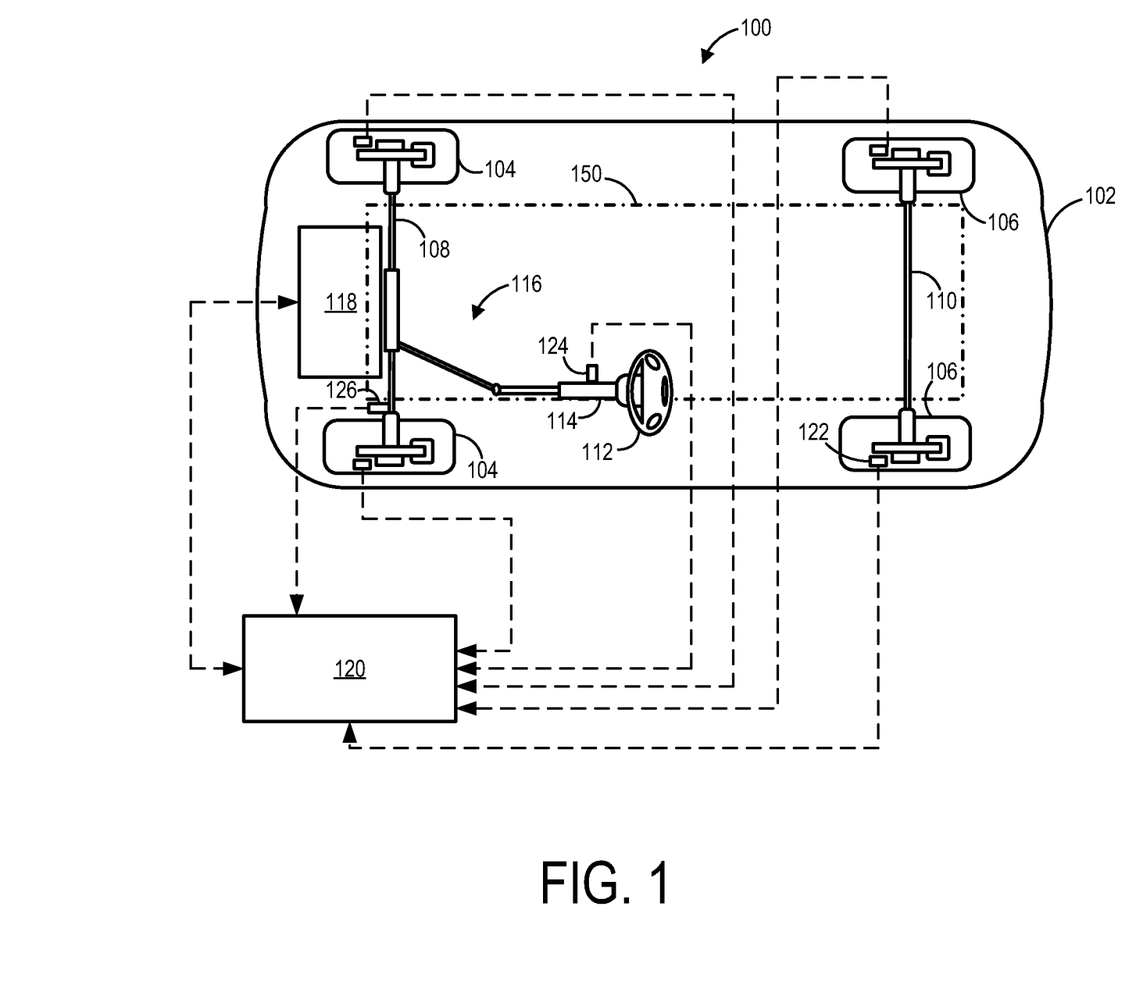
FIG. 1 shows an example of a steering system for a vehicle, including a steering assembly coupled to a steering wheel of the vehicle.
Figures 2A, 2B:
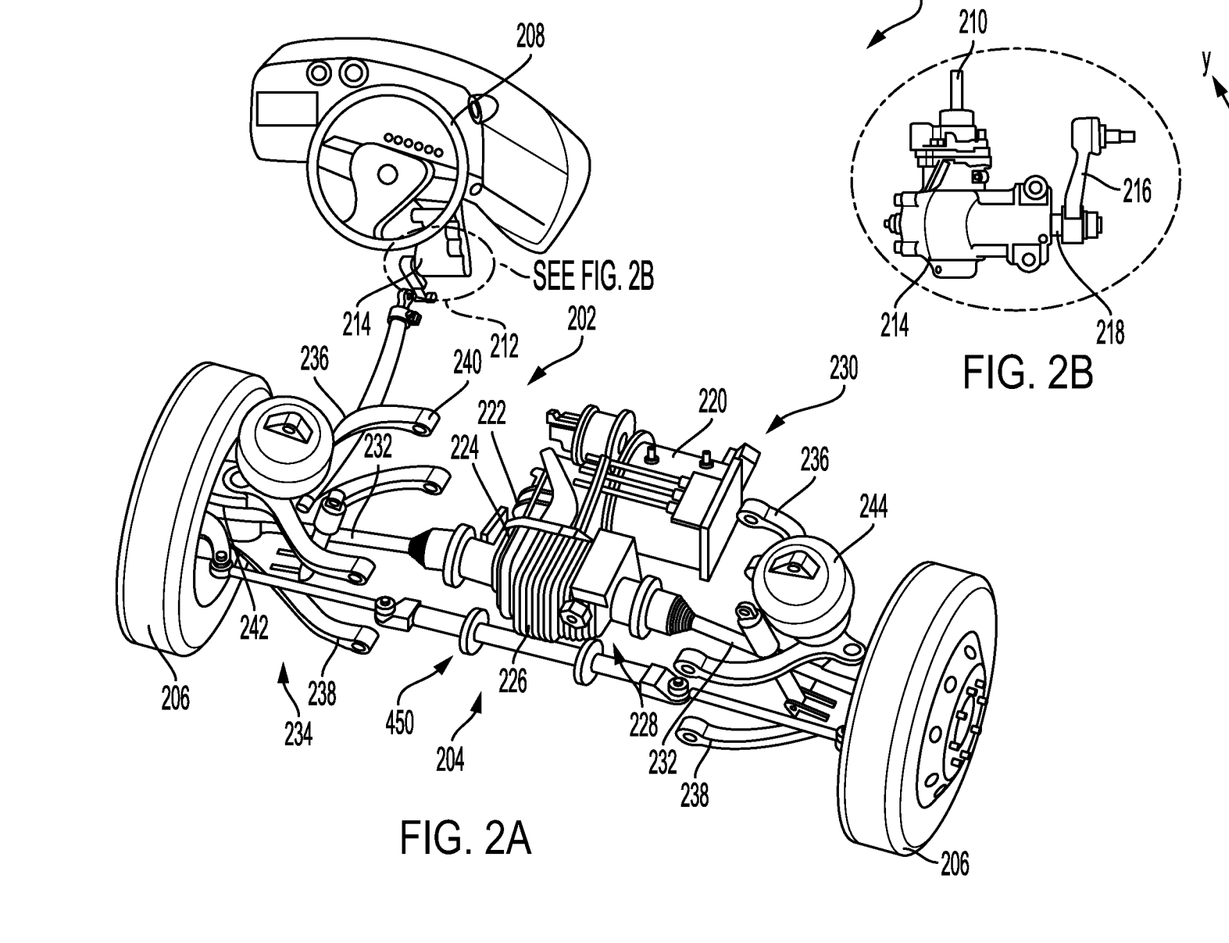
FIG. 2A shows an example of a steering assembly with a sliding middle link which may be included in the steering system of FIG. 1.
FIG. 2B shows an expanded view of a hydraulic steering gearbox to which the steering assembly of FIG. 2A may be coupled.

A simplified diagram of an example of a steering system 100 for a vehicle 102 is depicted in FIG. 1. The vehicle 102 has two front wheels 104 and two rear wheels 106. The front wheels 104 are coupled to one another by a front wheel linkage 108 and the rear wheels 106 are coupled to one another by a rear wheel linkage 110. The vehicle 102 may further include a front axle shaft and a rear axle shaft (not shown) extending between the front wheels 104 and the rear wheels 106, respectively. Steering of the vehicle 102 is provided at the front wheels 104 and an angle of the front wheels 104 is controlled by a steering wheel 112 which may be mounted on a steering column 114.

The steering wheel 112 may be linked to the front wheels 104 by a steering assembly 116 where the steering assembly 116 also includes the front wheel linkage 108. In one example, the steering assembly 116 may be a parallelogram steering assembly incorporating various components such as a pitman arm, an idler arm, a center link, etc. As such, the front axle shaft may be a rigid axle. In another example, the steering assembly 116 may be configured as a rack and pinion steering assembly where the front wheel linkage 108 has a rack coupled to tie rods, and the steering assembly 116 further includes components such as a pinion, a rotary valve, a steering arm, etc. In yet another example, the steering assembly 116 may have a sliding middle link instead of the rack used in the rack and pinion steering assembly and instead of the center link used in the parallelogram steering assembly, thereby allowing the steering assembly 116 to be coupled to a non-rigid front axle shaft while precluding rack and pinion gearing. When adapted with sliding middle link, the steering assembly 116 may be more compact and provide greater flexibility with respect to integration with different suspension systems. Details of the sliding middle link are provided further below, with reference to FIGS. 2-7.

The steering system 100 may rely on power steering to reduce an amount of effort demanded of a driver to turn the steering wheel 112. Power steering may be provided hydraulically, by mechanically coupling a servo system (not shown) to the steering assembly 116 or electrically, by incorporating an electric motor (not shown) in the steering assembly 116. In yet other examples, power steering may be provided without a direct mechanical connection to the steering assembly 116, instead supplying electrical power via electrical cables.

The vehicle 102 also includes an engine 118 positioned adjacent to the front wheel linkage 108. Air and fuel may be combusted at the engine 118 to provide power to drive rotation of the front wheels 104 and/or the rear wheels 106. The vehicle 102 may be adapted with rear-wheel drive, where power is directed to the rear wheels 106, as front-wheel drive, where power is directed to the front wheels 104, or four-wheel drive/all-wheel drive, where power may be selectively delivered to all the wheels. It will be appreciated that the steering system 100 shown in FIG. 1 is a simplified representation and may include various other components depending on a specific configuration of the system. For example, the steering system 100 may include additional different linkages or mechanisms coupling the axles to the wheels or may incorporate a shock absorbing mechanism, etc.

In some examples, the vehicle 102 may be adapted as an all-electric vehicle or a hybrid electric vehicle (HEV). In such instances, the vehicle 102 may include a battery pack 150 which, as shown in FIG. 1, may be a skateboard frame battery pack 150. The skateboard frame battery pack 150 may power, or supplement, propulsion of the front wheels 104 and rear wheels 106, and may occupy a large area between the wheels. In one example, the skateboard frame battery pack 150 may form a chassis of the vehicle. As such, the steering assembly 116 may have a geometry which accommodates a positioning of the skateboard frame battery pack 150 along an underside of the vehicle without undesirable contact and impingement between the steering assembly 116 and the skateboard frame battery pack 150.

The vehicle 102 further includes a controller 120, which may be an electronic control unit (ECU). The controller 120 is a computing device, such as a microcomputer that includes a processor unit, a non-transitory computer-readable storage medium device, input/output ports, memory, and a data bus. Computer-readable storage medium included in the controller 120 is programmable with computer readable data representing instructions executable by the processor for performing various control routines and methods. The controller 120 receives various signals from a plurality of sensors coupled to the steering system 100 that may be used to monitor vehicle navigation and speed. For example, the controller 120 may receive data from wheel rotation sensors 122 to determine whether the vehicle 102 is stationary or moving and monitor a speed at each wheel. The controller 120 may also receive a signal from a steering sensor 124, coupled to the steering column 114, as shown in FIG. 1, or to the steering wheel 112 in other examples. The steering sensor 124 allows the controller 120 to monitor which direction the steering wheel 112 is turned and an angle through which the steering wheel 112 is rotated. At least one position sensor 126 in the steering assembly may to measure an actual angle of the front wheels 104. The vehicle 102 may include various other sensors not shown in FIG. 1 to monitor various operating conditions, such as engine sensors to monitor parameters such as pressure, temperature, speed, etc., amongst others.

The controller 120 is operable to adjust various actuators based on the signals obtained from the sensors shown in FIG. 1, as well as other sensors not depicted, as well as instructions stored on the memory of the controller. For example, when the vehicle is navigating through a turn, the controller may compare a speed of an inner wheel of the front wheels 104 to an outer wheel of the front wheels 104, as measured by the wheel rotation sensors and increase a speed of rotation of the outer wheel when the rotational speed of the outer wheel is determined to be too low to allow the vehicle to turn as requested based on rotation of the steering wheel, as detected by the steering sensor 124.

As described above, a steering assembly of a vehicle may be adapted with a sliding middle link. An example of a steering system 200 with a steering assembly 202 including a sliding middle link 204 is depicted in FIG. 2A, coupled to front wheels 206 of a vehicle, such as the vehicle 102 of FIG. 1. A set of reference axes 201 are provided, indicating a y-axis, an x-axis, and a z-axis. In one example, the y-axis may be parallel with a direction of gravity and referred to as a vertical direction, the x-axis as a horizontal direction, and the z-axis as a transverse direction.

The steering system 200 includes a steering wheel 208, which may be coupled to a steering column 210, as shown in an expanded view in FIG. 2B, indicated by dashed area 212 in FIG. 2A. The steering column 210 may rotate as compelled by rotation of the steering wheel 208, the steering column rotating about the y-axis. The steering wheel 208 may be connected to a hydraulic steering gearbox 214 by the steering column 210. The hydraulic steering gearbox 214 may be powered by a hydraulic pump (not shown) which may multiply a rotational force exerted on the steering wheel 208 by a driver, allowing the steering system 200 to provide power steering.

The hydraulic pump is coupled to the steering assembly 202 by a linkage 216 configured to convert angular motion of the steering wheel 208 to linear motion in the steering assembly 202. In one example, the linkage 216 may be a pitman arm 216, included as a component in the steering assembly 202, where the pitman arm 216 moves in a circular motion about a ball joint 218. The pitman arm 216 may rotate about the x-axis, thus rotating along a direction perpendicular to the rotation of the steering column 210. As such, rotation of the steering column 210 is perpendicularly transposed to rotation of the pitman arm 216. The steering assembly includes various components linking the steering wheel 208 to the front wheels 206 and is described in detail further below with reference to FIG. 3.

Rotation of the front wheels 206 may be driven by an engine 220, similar to the engine 118 of FIG. 1. A torque converter 222 may be arranged between the engine 220 and a transmission 224 when the engine 220 and transmission 224 are configured as an automatic transmission system, providing a fluid coupling between the engine 220 and the transmission 224. However, when the engine 220 and the transmission 224 are configured as a manual transmission system, a clutch may replace the torque converter 222. A differential 226 may be coupled to the transmission 224 to control rotation of the front wheels 206 during navigation through turns, allowing an outer wheel to rotate faster than an inner wheel during a turn. Together, the transmission 224 and the differential 226 may form a drive train 228 of the vehicle. The drive train 228, along with the engine 220 and torque converter 222, may be included in a power train 230 of the vehicle.

The drive train 228 couples to each of the front wheels 206 by drive shafts 232, the drive shafts 232 extending in opposite directions along the x-axis between the drive train 228 and each of the front wheels 206, coupling directly to the front wheels 206. The drive shafts 232 may convey rotational energy from the power train 230 to the front wheels 206. A suspension system 234 may be coupled to the front wheels 206 to allow relative motion between a vehicle chassis and the front wheels 206.

The suspension system 234 may incorporate independent double wishbone suspensions, as shown in FIG. 2A, including a first wishbone arm 236 and a second wishbone arm 238 at each of the front wheels 206. The suspension system 234 is not directly coupled to the steering assembly 202. The first and second wishbone arms 236, 238 may be arranged parallel with one another along the x-z plane with the first wishbone arm 236 forming an upper portion of the suspension system 234 and stacked over the second wishbone arm 238 along the y-axis. Each end of each of the first and second wishbone arms 236, 238 has a pivot 240 which couples to the vehicle chassis. The first and second wishbone arms 236, 238 are coupled to one another by an upright 242 and shock absorbers 244 and coil springs (not shown) may be mounted to each of the double wishbone suspensions to control vertical movement. When configured as double wishbone suspensions, the suspension system 234 may be more readily tuned and optimized and provide a more lightweight and compact mechanism than other types of suspension systems, such as a MacPherson strut, a multi-link suspension, etc.

A portion of the steering assembly 202 may also extend between the front wheels 206, parallel with and spaced away from the drive shafts 232, the transmission 224, and the differential 226. The steering assembly 202 is depicted separately in FIG. 3, e.g., without the front wheels 206, steering wheel 208, hydraulic steering gearbox 214, power train 230 or drive train 228. The steering assembly 202 is also shown in FIGS. 4 and 5 but coupled to the front wheels and including a portion of the suspension system 234 (e.g., only the second wishbone arm 238 is shown). A top view 400 of the steering assembly 202 illustrated in FIG. 4 and a rear view 500 of the steering assembly 202 is depicted in FIG. 5. Furthermore, the sliding middle link 204 of the steering assembly 202 is depicted without an outer housing in FIGS. 4 and 5 for brevity.

The steering assembly 202 includes a first linkage assembly 350, which may be a steering column linkage 350, extending along the z-axis parallel with a length of the vehicle, as shown in FIGS. 4 and 5, substantially perpendicular to the sliding middle link 204. The steering column linkage 350 includes the pitman arm 216, a first joint 301, a drag link 302, and a second joint 303, all aligned along the z-axis. The drag link 302 may be coupled to the pitman arm 216 via the first joint 301 at a first end 304 of the drag link 302 and couple to a steering arm 308 at a second end 306 of the drag link 302 via the second joint 303. The steering arm 308 may extend along the x-axis, perpendicular to the steering column linkage 350. The pitman arm 216 may rotate about the first joint 301 and the steering arm 308 may rotate about the second joint 303. The drag link 302 may convey rotation of the pitman arm 216 to the steering arm 308, where a sweeping motion of the steering arm 308 through an arc along the x-z plane is converted into linear motion at components of the steering assembly 202 extending between the vehicle front wheels, e.g., the front wheels 206 of FIG. 2A. Specific motions of the various steering assembly components will be described further below with reference to FIGS. 4-7.

Figure 3:
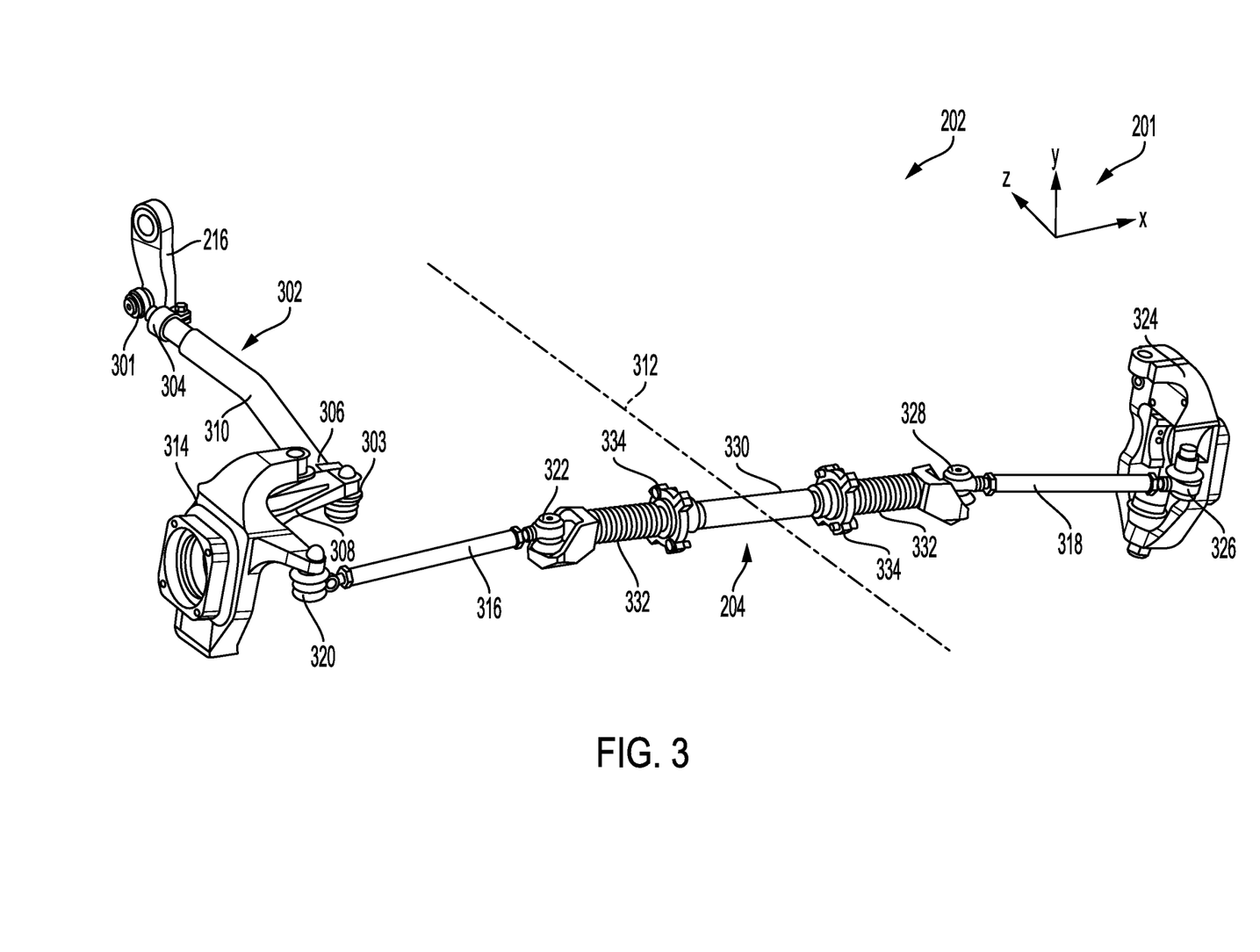
FIG. 3 shows a detailed view of the steering assembly with the sliding middle link of FIG. 2A.
Figure 4:
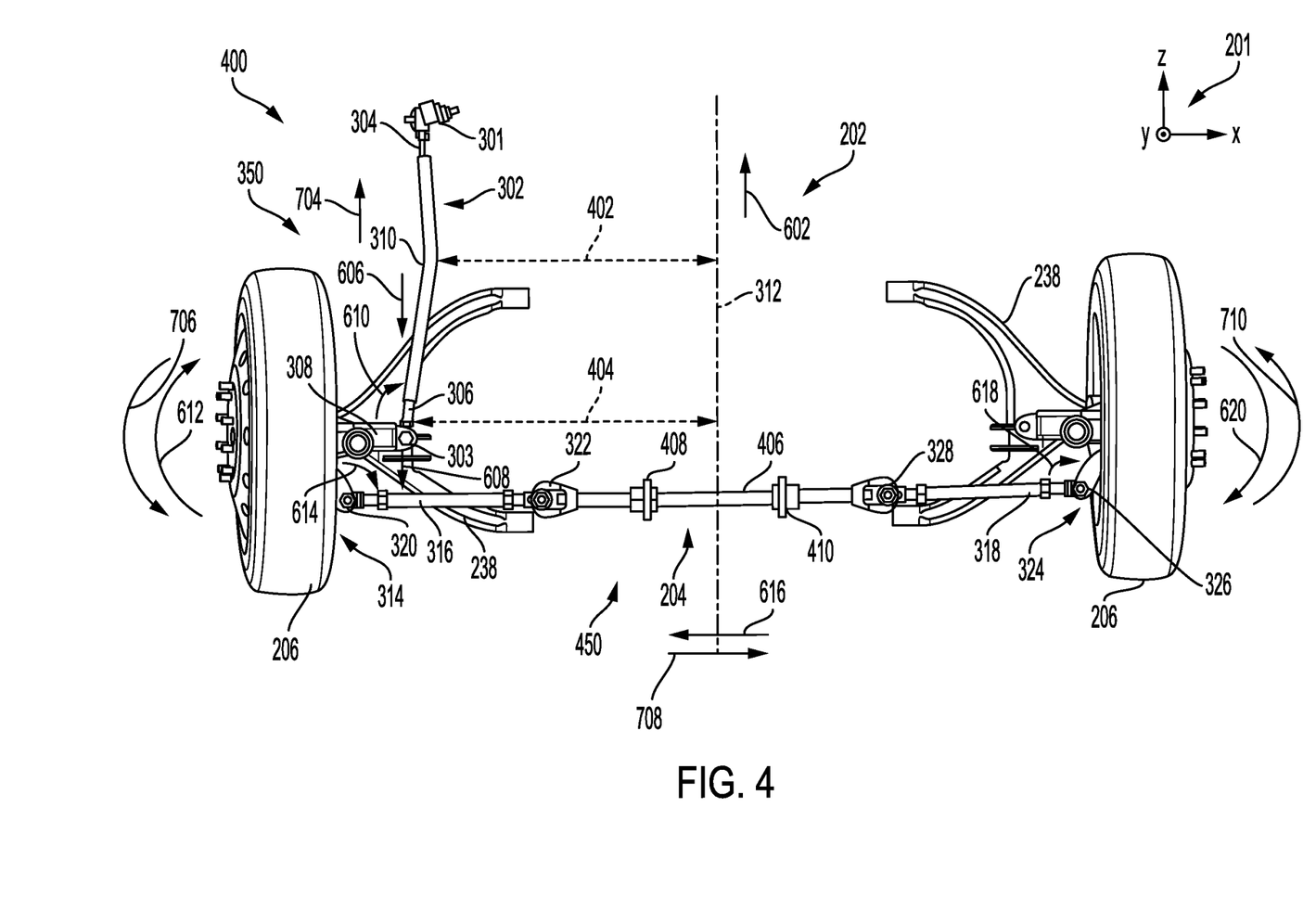
FIG. 4 shows the steering assembly of FIG. 2A with an outer housing of the sliding middle link removed, from a top view.
Figure 5:
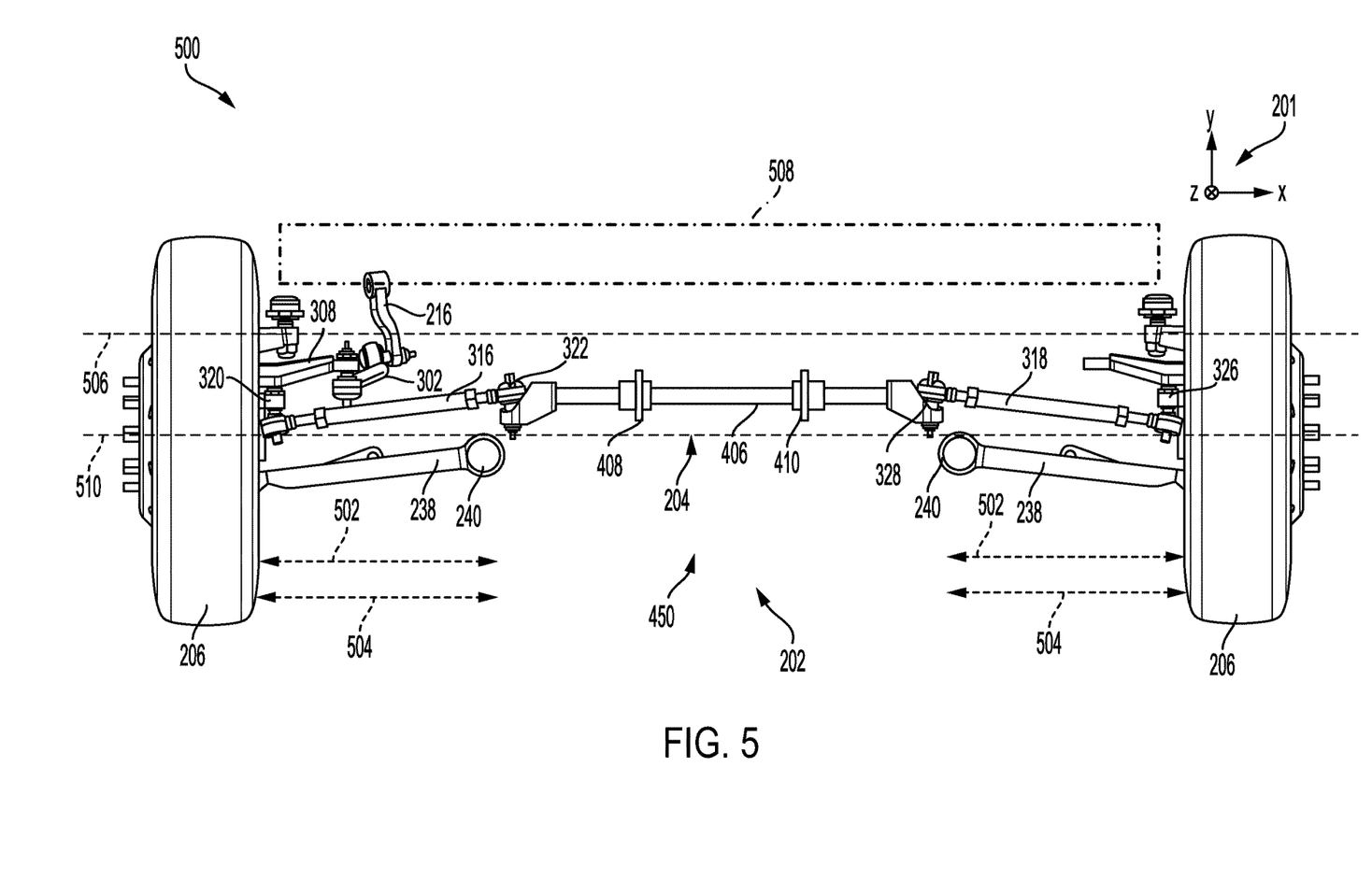
FIG. 5 shows the steering assembly of FIG. 2A with the outer housing of the sliding middle link removed, from a rear view.

The drag link 302 may not be linear, instead having a bend 310 at a point between the first end 304 and the second end 306, as shown in FIGS. 3 and 4. The drag link 302 may bend along the x-z plane. As illustrated in FIG. 4, a distance 402 between the drag link 302 at the bend 310 and a center line 312 of the steering assembly 202 may be smaller than a distance 404 between the second end 306 of the drag link 302 and the center line 312. The center line 312 may be parallel with the z-axis and bisect the steering assembly 202.

The bend 310 may mitigate interference of the drag link 302 with one of the front wheels 206, e.g., the driver side front wheel, by allowing the drag link 302 to bend away from the front wheel. Additionally, the bend 310 may provide a weak point in the drag link 302 that breaches when the vehicle experiences a hard impact. The bend 310 may break before any other steering component, thus circumventing degradation of other, more costly components.

Motion of the drag link 302 is transferred through the steering arm 308 to a first wheel plate 314 coupled to the steering arm 308, as shown in FIG. 3. The first wheel plate 314 may be attached directly to the one of the front wheels 206, e.g., a driver side front wheel, so that the first wheel plate 314, as compelled by transfer of motion through the pitman arm 216, drag link 302, and steering arm 308, rotates about the y-axis. The rotation of the first wheel plate 314 drives turning of the attached driver side front wheel. The transfer of motion may be propagated to a passenger side front wheel of the front wheels 206 via the sliding middle link 204, a first tie rod 316 and a second tie rod 318.

The first tie rod 316 may extend between the sliding middle link 204 and the first wheel plate 314, coupling to the first wheel plate 314 at a first hinge 320 and to the sliding middle link 204 at a first kneecap 322. The first wheel plate 314 may rotate about the first hinge 320. The first kneecap 322 may provide a small amount of movement of the first tie rod 316 about the first kneecap 322, e.g., along the y-axis and the x-z plane, as well as negligible rotation of the first tie rod. In other words, a linear structure formed by the first tie rod 316 and the sliding middle link 204 may flex at the first kneecap 322 but not rotate substantially relative to one another.

The second tie rod 318 may extend between the sliding middle link 204 and a second wheel plate 324, coupling to the second wheel plate 324 at a second hinge 326 and to the sliding middle link 204 at a second kneecap 328. The second kneecap 328, similar to the first kneecap 322, may allow a small amount of movement of the second tie rod 318 along the y-axis and the x-z plane but does not allow rotation of the second tie rod 318 about the first kneecap 322. A linear structure formed by the second tie rod 318 and the sliding middle link 204 may flex at the second kneecap 328 but not rotate relative to one another. The second wheel plate 324 may rotate about the second hinge 326 and may be attached to the passenger side front wheel in a similar manner as the first wheel plate 314 to the driver side front wheel.

The sliding middle link 204 may have an outer housing 330 with springs 332 arranged at opposite ends of the outer housing 330, the springs 332 configured to contract and expand along the x-axis. Clamps 334 may be positioned between each of the springs 332 and an end of the outer housing 330, the clamps 334 used to secure the outer housing 330 to the vehicle chassis. Together, the outer housing 330, clamps 334, and springs 332, e.g., outer components of the sliding middle link 204, form a tube extending along the x-axis. The outer components may enclose an inner rod 406, as shown in FIGS. 4 and 5, the inner rod 406 extending between the first kneecap 322 and the second kneecap 328 and coupled at either end to the first and second tie rods 316, 318 by first and second kneecaps 322, 328. The springs 332 may be positioned so that one of the springs 332 extends between and abuts the first kneecap 322 and one of the clamps 334 and the other of the springs 332 extends between and abuts the other of the clamps and the second kneecap 328.

The inner rod 406 may be threaded through a first guide ring 408 and a second guide ring 410, as shown in FIGS. 4 and 5. The first and second guide rings 408, 410 may be enclosed within and held in place by the clamps 334, as shown in FIG. 3, thereby fixing the guide rings in place relative to the vehicle chassis. As such, the inner rod 406, as shown in FIGS. 4 and 5, may move relative to the vehicle chassis but the first and second guide rings 408, 410 do not.

The inner rod 406 may be constrained within the outer housing 330 to only move linearly, e.g., along the x-axis, sliding through the first and second guide rings 408, 410. Thus, the first tie rod 316, the inner rod 406 and the second tie rod 318 may move along the x-axis as a single unit. The first tie rod 316, the inner rod 406, and the second tie rod 318, and coupling mechanisms form a second linkage assembly 450 of the steering assembly 202 and will be referred hereafter as a wheel linkage 450, where the wheel linkage 450 extends across a width of the vehicle, along the x-axis. As shown in FIG. 2A, the wheel linkage 450, even with the outer components of the sliding middle link 204 included, has a small footprint in a front end of the vehicle, enabling the wheel linkage 450 to be spaced away from the first and second wishbone arms 236, 238 at each of the front wheels 206 of the suspension system 234, along the y-axis as well as spaced away from the drive train 228. The wheel linkage 450 may extend in a region between the first and second wishbone arms 236, 238 along the y-axis, distanced sufficiently away from both wishbone arms so that vertical motion of the suspension system 234 does not result in contact between the wishbone arms and the wheel linkage 450. By enabling the steering assembly 202 to be compatible with the suspension system 234 having the independent double wishbone suspensions, the wheel linkage 450 and the suspension system 234 may be independent of one another. Though vertical motion of the first and second tie rods 316, 318 may be demanded, vertical motion, as well as fore-aft (transverse) motion, of the inner rod 406 may not be demanded, thus allowing a footprint of the wheel linkage 450 as a whole to be reduced relative to a conventional steering assembly, such as a parallelogram steering system. Further, an overall geometry of the wheel linkage 450 may be precisely configured and optimized with respect to the overall suspension system 234 to mitigate bump steering (wherein, upon the front wheels 206 pass over an uneven driving surface, the steering wheel 208 may unexpectedly rotate in an undesirable direction during a suspension stroke).

The first and second kneecaps 322, 328 may extend a similar distance 502, as shown in FIG. 5 along the x-axis away from the closest front wheel 206 as a distance 504 that the second wishbone arm 238 (and the first wishbone arm 236) extends along the x-axis away from the closest front wheel 206. As such, the first and second kneecaps 322, 328 may be substantially aligned with one pivot 240 of each of the second wishbone arm 238 and first wishbone arm 236 along the y-axis and the alignment may be maintained through movement of the steering assembly 202 and front wheels 206. Thus a relative geometry of the suspension system 234 and the steering assembly 202 may remain constant, which may reduce an occurrence of bump steer where undesirable uncontrolled steering of the front wheels 206 occurs without input from the steering wheel.

Sliding of the wheel linkage 450 along the x-axis may be initiated by rotation of the steering wheel, e.g., the steering wheel 208 of FIG. 2A, and the rotational motion may be translated through the steering column, to the steering column linkage 350 and steering arm 308, and to the first wheel plate 314. Turning of the first wheel plate 314 may force the wheel linkage 450 to slide and the sliding may be constrained along a linear path due to securing of the outer components of the sliding middle link 204 to the vehicle chassis at the clamps 334. The linear motion of the wheel linkage 450 may compel turning of the second wheel plate 324 in unison with the first wheel plate 314. Thus, the first and second wheel plates 314, 324 may rotate through a similar angle relative to the center line 312, as shown in FIG. 4, when turning of the vehicle front wheels is requested by the driver.

Figure 6:
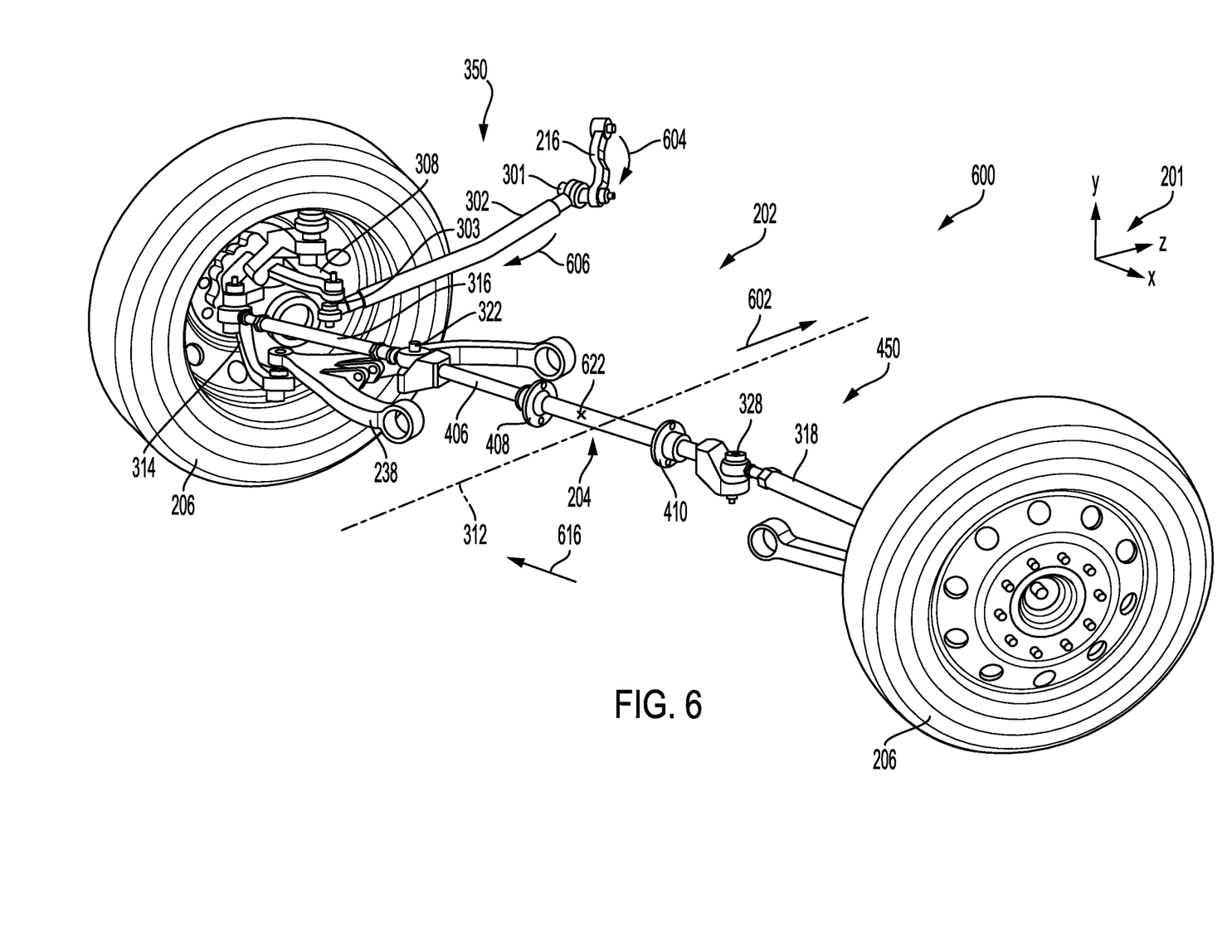
FIG. 6 shows the steering assembly of FIG. 2A in a first position.

Motion at each component of the steering assembly 202 will now be described. To further illustrate transfer of motion through the steering assembly 202, the steering assembly 202 is depicted in FIG. 6 in a first position 600, where the front wheels 206 are turned to facilitate a vehicle turn to the right (relative to the driver), and in FIG. 7 in a second position 700, where the front wheels 206 are turned to facilitate a vehicle turn to the left. A direction of forward travel is indicated by arrow 602.

Turning first to FIG. 6, the right turn may be initiated by the driver rotating the steering wheel to the right, e.g., in a clockwise direction. The clockwise rotation of the steering wheel may drive rotation of the pitman arm 216 about the ball joint (e.g., the ball joint 218 of FIG. 2B) through the y-x plane as indicated by arrow 604. The rotation of the pitman arm 216 may be translated into mostly linear motion of the drag link 302 at the first joint 301, causing the drag link 302 to shift along the z-axis in a rocking motion. For example, the drag link 302 may move along the z-axis in a direction opposite of forward travel (as indicated by arrow 602) through a shallow arc in the y-z plane, as indicated by arrow 606.

As illustrated in FIG. 4, the motion of the drag link 302, as indicated by arrow 606, may be linear along the z-axis. At the second joint 303, connecting the drag link 302 to the steering arm 308, the linear motion of the drag link 302 along the z-axis may force the steering arm 308 to both shift along the z-axis, as indicated by arrow 608 and pivot, as indicated by arrow 610. The steering arm 308 may be fixedly attached to the first wheel plate 314 so that the steering arm 308 does not pivot or change angle relative to the first wheel plate 314. For example, the steering arm 308 may be welded or bolted to the first wheel plate 314. Thus, motion of the steering arm 308, as indicated by arrow 608 and 610, may compel the first wheel plate 314, and the front wheel 206 on the driver side, to rotate as indicated by arrow 612 in FIG. 4. Rotation of the first wheel plate 314, and the attached front wheel 206, alters an angle, e.g., causes the angle to decrease, between the first wheel plate 314 and the first tie rod 316 at the first hinge 320, as indicated by arrow 614 in FIG. 4. As the first wheel plate 314 rotates, the wheel linkage 450 (e.g., the first tie rod 316, the inner rod 406, and the second tie rod 318) of the steering assembly 202 may be forced to slide to the left as indicated by arrow 616 in FIGS. 4 and 6.

As the wheel linkage 450 slides to the left, attachment of the second tie rod 318 to the second wheel plate 324 at the second hinge 326 causes an angle between the second tie rod 318 and the second wheel plate 324 to change, e.g., the angle increases, at the second hinge 326, as indicated by arrow 618. The linear motion of the wheel linkage 450 along the x-axis drives rotation of the second wheel plate 324 via the second hinge 326, forcing the second wheel plate 324, and the attached front wheel 206, to turn as indicated by arrow 620. The second wheel plate 324 may rotate by a similar amount, e.g., through a similar range of angles, as the first wheel plate 314. The transfer of the rotation from the steering wheel through the steering assembly 202 may occur nearly instantaneously, resulting in minimal delay between rotation of the driver side front wheel and rotation of the passenger side front wheel.

A length of the sliding middle link 204, the length defined along the x-axis, may be optimized to accommodate a maximum rotation of the front wheels 206. For example, the steering wheel may be rotated clockwise by the driver to a stopping point. The rotation of the steering wheel may translate to a turning of the front wheels 206 to the right, relative to forward travel, as indicated by arrow 602 in FIG. 6, of the vehicle to a maximum angle between 30-50 degrees relative to the center line 312. The maximum rotation of the front wheels 206 to the right is shown in the first position 600 of FIG. 6.

When the front wheels 206 are rotated to the maximum angle, the sliding middle link 204 may be shifted to the left relative to the center line 312. For example, a midpoint 622 of the sliding middle link 204 may be left of the center line 312. The first kneecap 322 may be spaced further away from the first guide ring 408 than the second kneecap 328 from the second guide ring 410 along the x-axis. However, a small distance between the second kneecap 328 and the first guide ring 408 is maintained even when the front wheels are rotated to the maximum angle as shown in FIG. 6 so that the second kneecap 328, too bulky to pass through the second guide ring 410, does not impinge on the second guide ring 410 and inhibit sliding of the inner rod 406 before the front wheels 206 reach the maximum angle of rotation.

When enclosed within the outer components of the sliding middle link 204, the springs 332 (as shown in FIG. 3) may accommodate sliding of the inner rod 406. For example, when the steering assembly 202 is in the first position 600 of FIG. 6, one of the springs 332 arranged between the second guide ring 410 and the second kneecap 328 may contract and one of the springs 332 arranged between the first guide ring 408 and the first kneecap 322 may expand. When the steering assembly 202 is adjusted to the second position 700 of FIG. 7, the spring between the second guide ring 410 and the second kneecap 328 may expand and the spring between the first guide ring 408 and the first kneecap 322 may contract. The springs 332 may have lengths, as defined along the x-axis, and spring forces optimized to enable contraction of the springs 332 to a minimum length, e.g., the distance between the second guide ring 410 and the second kneecap 328 in the first position 600, and expansion of the springs 332 to a maximum length, e.g., the distance between first guide ring 408 and the first kneecap 322 in the first position 600, without resisting sliding of the inner rod 406 of the sliding middle link 204.

Figure 7:
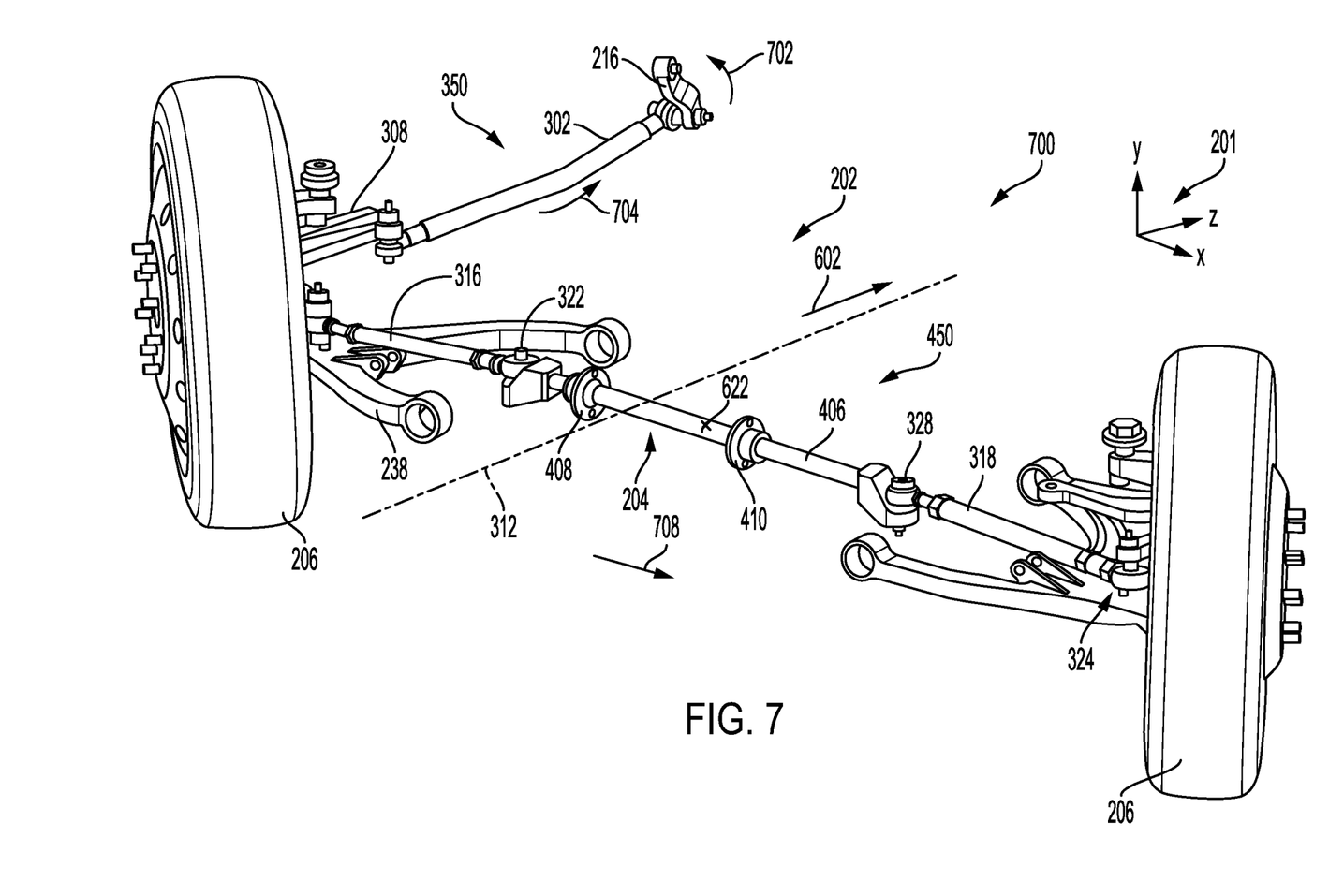
FIG. 7 shows the steering assembly of FIG. 2A in a second position.

Adjusting the front wheels 206 to the second position 700 shown in FIG. 7 may include similar motions as described for the first position 600 of FIG. 6 but along opposite directions. For example, the steering wheel may be rotated counterclockwise, driving rotation of the pitman arm 216 through the y-z plane as indicated by arrow 702 in FIG. 7. The drag link 302 may be shifted as indicated by arrow 704 due to rotation of the pitman arm 216, moving through a shallow arc in the y-z plane and linearly along the z-axis, as shown in FIG. 4.

Turning now to FIG. 4, when the drag link 302 slides as indicated by arrow 704, the steering arm 308 may be forced to pivot in an opposite direction from that indicated by arrow 610 at the second joint 303. The first wheel plate 314 may rotate as indicated by arrow 706, increasing the angle between the first wheel plate 314 and the first tie rod 316 at the first hinge 320, e.g., in a direction opposite of arrow 614. The wheel linkage 450 may slide to the right, as indicated by arrow 708, causing the angle between the second tie rod 318 and the second wheel plate 324 to decrease, e.g., in a direction opposite of arrow 618. The sliding of the wheel linkage 450 thus drives turning of the second wheel plate 324, and attached front wheel 206, as indicated by arrow 710.

Returning to FIG. 7, the second position 700 may represent a maximum rotation of the front wheels 206 to the left, relative to forward travel as indicated by arrow 602. The front wheels 206 may be adjusted to the second position 700 when the driver rotates the steering wheel counterclockwise to a maximum extent. The front wheels may turn to a maximum angle between 30-50 degrees relative to the center line 312 due to sliding of the wheel linkage 450 of the steering assembly 202 to the right as indicated by arrow 708. The sliding middle link 204 is biased to the right of the center line 312 such that the midpoint 622 of the sliding middle link 204 is positioned to the right of the center line 312.

In the second position 700, the second kneecap 328 is spaced further away along the x-axis from the second guide ring 410 than the first kneecap 322 from the first guide ring 408. However, a small distance between the first kneecap 322 and the first guide ring 408 may be maintained even when the front wheels 206 are turned to the maximum angle to the left, as shown in FIG. 7. As a result of the length of the sliding middle link 204, the first kneecap 322 does not impinge on the first guide ring 408 and inhibit sliding of the wheel linkage 450 along the x-axis when the front wheels 206 are rotated to a maximum extent to the left.

As described above, motion of the components of the steering assembly 202 may be minimized along the y-axis, with any large, sweeping motions constrained to the x-z plane. With the exception of the pitman arm 216, the steering assembly 202 is maintained below a certain height, e.g., along the y-axis. For example, as shown in FIG. 5, all components of the steering assembly 202 (except for the pitman arm 216) are below dashed line 506. In particular, the wheel linkage 450, including the first hinge 320, the first tie rod 316, the first kneecap 322, the inner rod 406, the first and second guide rings 408, 410, the second kneecap 328, the second tie rod 318, and the second hinge 326, as well as the outer components of the sliding middle link 204, extend along a common plane parallel with the x-z plane. Dashed line 506 may represent a height at which an upper wishbone arm of the suspension system, e.g., the first wishbone arm 236 illustrated in FIG. 2A may be attached to the first and second wheel plates 314, 324, and protrude along the x-axis, between the front wheels 206.

By positioning the steering assembly 202 below dashed line 506, the vehicle may be adapted with a skateboard frame battery pack 508, e.g., for an electric vehicle, without undesirable contact occurring between the steering assembly 202 and the skateboard frame battery pack 150. The skateboard frame battery pack 508 may be similar to the skateboard frame battery pack 150 shown in FIG. 1, extending along a length of the vehicle, e.g., along the z-axis, and across a large portion of a width of the vehicle, e.g., between the front wheels 206. Clearance between the steering assembly 202 and the skateboard frame battery pack 508, which may form a chassis of the vehicle, may be maintained even during navigation across rough, uneven terrain where vertical displacement of the vehicle chassis relative to the vehicle wheels may occur.

As another example, the reduced footprint and vertically low positioning of the steering assembly 202 may accommodate a low positioning of an engine proximate to the vehicle front wheels 206, as shown in FIGS. 1 and 2 while maintaining a desired amount of ground clearance. The steering assembly 202 may be offset from the engine, such as in front of and/or below, and also provide sufficient packaging space to incorporate a drivetrain proximate to the front wheels 206.

As shown in FIG. 5, the wheel linkage 450 of the steering assembly 202 is maintained at a height, e.g., a distance from a ground surface to the wheel linkage 450 along the y-axis, close to an axle height, as indicated by dashed line 510, of the front wheels 206. For example, the axle height may be the height along the y-axis that front wheel drive shafts, such as the drive shafts 232 of FIG. 2A, extend between the front wheels 206. The axle height may provide a boundary for how low the transmission and differential as well as the engine coupled to the transmission may be positioned. Similarly, the skateboard frame battery pack 508 may be arranged above the axle height (as well as above dashed line 506, depending on a width of the skateboard frame battery pack 508). Thus, by maintaining the wheel linkage 450 of the steering assembly 202 near the axle height, the steering assembly 202 does not adversely affect positioning of the transmission, differential, and the skateboard frame battery pack 508.

In addition, the steering column linkage 350 does not couple directly to the wheel linkage 450 of the steering assembly 202. Instead, the steering column linkage 350 is biased to one side of the vehicle, e.g., the driver side, connecting to the first wheel plate 314 via the steering arm 308. The wheel linkage 450 is spaced away from and not directly connected to the steering wheel. By positioning the steering column linkage 350 to one side, the perpendicular extension of the steering column linkage 350 along the z-axis does not interfere with components positioned between the front wheels 206, e.g., the engine, the transmission, the skateboard frame battery pack 508, etc. The steering assembly 202 is thereby operated by propagating motion from the steering wheel, along the z-axis and along one side of the vehicle, and to one front wheel via the steering column linkage 350. The motion is then transmitted in a perpendicular direction, along the x-axis, to the other front wheel via the wheel linkage 450. As a result, while motion of the steering column linkage 350 is directed along the z-axis, both a structure and motion of the wheel linkage 450 is constrained to the x-axis. As such, the wheel linkage 450 occupies minimal space along the z-axis and y-axis and precludes any linkages extending along the z-axis through a central region between the front wheels 206.

In this way, a steering assembly for a vehicle may provide translation of rotational movement of a steering wheel to linear motion at a sliding middle link of the steering assembly, where the linear motion drives turning of the vehicle front wheels. Implementation of the steering assembly allows motorization of the front wheels and incorporation of hydraulic power steering. A portion of the steering assembly extends between the front wheels, including the sliding middle link and tie rods coupled to either end of the sliding middle link, sliding linearly along a horizontal direction and communicating turning of one of the front wheels to the other of the front wheels. Turning of the front wheels may be compelled by translation of rotational movement at the steering wheel to linear motion at a drag link extending between the steering wheel and one of the front wheels, the drag link biased along one side of the vehicle, arranged perpendicular to the sliding middle link, and configured to drive turning of the driver side front wheel. The steering assembly may include fewer moving components and have a smaller footprint than a parallelogram steering system, thus allowing motorizing parts to be coupled to the front wheels without affecting a position of a vehicle engine proximate to the front wheels. The steering assembly may also be less costly and less complex than a rack and pinion steering system, precluding a demand for a rack suitable for a heavy-duty vehicle. In addition, the steering assembly may accommodate different vehicle suspension systems, including independent double wishbone suspensions.

FIGS. 2A-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The disclosure also provides support for a steering assembly for a vehicle, the steering assembly comprising: a first linkage assembly extending along a first direction between a steering wheel of the vehicle and a first wheel plate of the steering assembly, a second linkage assembly extending along a second direction, perpendicular to the first direction, between the first wheel plate and a second wheel plate of the steering assembly, the second linkage assembly including a sliding middle link coupled to the first wheel plate and the second wheel plate via tie rods at either end of the sliding middle link. In a first example of the steering assembly, the first linkage assembly extends along a direction parallel with a length of the vehicle, along one side of the vehicle and not through a central region between the first wheel plate and the second wheel plate, and wherein the first linkage assembly does not couple directly to the second linkage assembly. In a second example of the steering assembly, optionally including the first example of the steering assembly, the first linkage assembly includes a pitman arm and a drag link coupled to the pitman arm by a first joint and wherein the pitman arm is coupled to a steering column of the steering wheel by a hydraulic steering gearbox. In a third example of the steering assembly, optionally including one or more of the first and second examples of the steering assembly, the drag link is configured to move along the first direction and not the second direction and wherein the drag link includes a bend at a midpoint along a length of the drag link. In a fourth example of the steering assembly, optionally including one or more of the first through third examples of the steering assembly, the first linkage assembly is connected at a second joint to a steering arm extending along the second direction from the first wheel plate and wherein the steering arm is fixedly attached to the second joint where the steering arm does not move relative to the first wheel plate. In a fifth example of the steering assembly, optionally including one or more of the first through fourth examples of the steering assembly, the second linkage assembly does not directly couple to the steering wheel of the vehicle and is spaced away from the steering wheel by the first linkage assembly and wherein the second linkage assembly is configured to move only along the second direction. In a sixth example of the steering assembly, optionally including one or more of the first through fifth examples of the steering assembly, the tie rods and the sliding middle link extend along a common plane below an engine and/or a battery of the vehicle and wherein the tie rods and the sliding middle link slide along the second direction in the common plane as a single unit.

The disclosure also provides support for a vehicle, comprising: a steering assembly, with a sliding middle link positioned between front wheels of the vehicle, the steering assembly configured to transfer rotational movement from a steering wheel of the vehicle to linear movement via a pitman arm, a drag link, a steering arm, a first wheel plate, a second wheel plate, tie rods, and the sliding middle link, and a suspension system coupled to the first wheel plate and the second wheel plate. In a first example of the vehicle, the drag link is arranged perpendicular to the sliding middle link, extending along one side of the vehicle between the steering wheel and the first wheel plate, and wherein the drag link does not couple to the sliding middle link. In a second example of the vehicle, optionally including the first example of the vehicle, the sliding middle link has a set of outer components including an outer housing, clamps, and springs and wherein the outer components enclose an inner rod and a first guide ring and a second guide ring of the sliding middle link. In a third example of the vehicle, optionally including one or more of the first and second examples of the vehicle, the inner rod is threaded through the first guide ring and the second guide ring and configured to slide through the first and second guide rings and wherein the first and second guide rings are each enclosed by one of the clamps. In a fourth example of the vehicle, optionally including one or more of the first through third examples of the vehicle, the clamps and the enclosed first and second guide rings are fixedly attached to a vehicle chassis and wherein the inner rod moves relative to the vehicle chassis and the enclosed first and second guide rings do not move relative to the vehicle chassis. In a fifth example of the vehicle, optionally including one or more of the first through fourth examples of the vehicle, the tie rods includes a first tie rod extending between a first end of the inner rod and the first wheel plate, the first tie rod coupled to the first end of the inner rod by a first kneecap and coupled to the first wheel plate by a first hinge, and wherein the tie rods includes a second tie rod extending between a second end of the inner rod, opposite of the first end, and the second wheel plate, the second tie rod coupled to the second end of the inner rod by a second kneecap and coupled to the second wheel plate by a second hinge. In a sixth example of the vehicle, optionally including one or more of the first through fifth examples of the vehicle, the pitman arm is configured to rotate about an axis parallel with a width of the vehicle and wherein the rotation of the pitman arm is translated to linear motion of the drag link along a direction parallel with a length of the vehicle. In a seventh example of the vehicle, optionally including one or more of the first through sixth examples of the vehicle, the drag link is coupled to the steering arm by a joint, the steering arm attached to the first wheel plate, and wherein the linear motion of the drag link is converted to turning of both the steering arm and the first wheel plate at the joint. In an eighth example of the vehicle, optionally including one or more of the first through seventh examples of the vehicle, the turning of the first wheel plate compels sliding of the sliding middle link along a direction parallel with the width of the vehicle and wherein the sliding of the sliding middle link forces the second wheel plate to turn in unison with the first wheel plate. In a ninth example of the vehicle, optionally including one or more of the first through eighth examples of the vehicle, the first wheel plate and the second wheel plate are each attached to front wheels of the vehicle and wherein the turning of the first wheel plate and the second wheel plate forces the front wheels to turn in unison with the first and second wheel plates. In a tenth example of the vehicle, optionally including one or more of the first through ninth examples of the vehicle, the sliding middle link and the tie rods of the steering assembly are spaced away from and positioned vertically lower than an upper portion of the suspension system and wherein the suspension system is not coupled to the sliding middle link or tie rods and is configured as an independent double wishbone suspension system.

The disclosure also provides support for a steering system, comprising: a steering wheel coupled to a steering assembly, the steering assembly including a first linkage assembly, extending along one side of a vehicle, and a second linkage assembly with a sliding middle link, the second linkage assembly extending perpendicular to the first linkage assembly between front wheels of the vehicle, and wherein the steering assembly is configured to convert rotation of the steering wheel to linear motion along a first direction at the first linkage assembly and transfer the linear motion from the first linkage assembly to the second linkage assembly along a second direction, the second direction perpendicular to the first direction. In a first example of the steering system, the second direction is a horizontal direction along a width of the vehicle and wherein the second linkage assembly moves only along the horizontal direction and not along a vertical or transverse direction.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A steering assembly for a vehicle, the steering assembly comprising:
    a first linkage assembly extending along a first direction between a steering wheel of the vehicle and a first wheel plate of the steering assembly;
    a second linkage assembly extending along a second direction, perpendicular to the first direction, between the first wheel plate and a second wheel plate of the steering assembly, the second linkage assembly including a sliding middle link coupled to the first wheel plate and the second wheel plate via tie rods at either end of the sliding middle link, wherein the sliding middle link is positioned with at least one spring between a first of the ends of the sliding middle link and a first tie rod of the tie rods.

2. The steering assembly of claim 1, wherein the first linkage assembly extends along a direction parallel with a length of the vehicle, along one side of the vehicle and not through a central region between the first wheel plate and the second wheel plate, and wherein the first linkage assembly does not couple directly to the second linkage assembly.

3. The steering assembly of claim 2, wherein the first linkage assembly includes a pitman arm and a drag link coupled to the pitman arm by a first joint and wherein the pitman arm is coupled to a steering column of the steering wheel by a hydraulic steering gearbox.

4. The steering assembly of claim 3, wherein the drag link is configured to move along the first direction and not the second direction and wherein the drag link includes a bend at a midpoint along a length of the drag link.

5. The steering assembly of claim 3, wherein the first linkage assembly is connected at a second joint to a steering arm extending along the second direction from the first wheel plate and wherein the steering arm is fixedly attached to the second joint where the steering arm does not move relative to the first wheel plate.

6. The steering assembly of claim 1, wherein the second linkage assembly does not directly couple to the steering wheel of the vehicle and is spaced away from the steering wheel by the first linkage assembly and wherein the second linkage assembly is configured to move only along the second direction.

7. The steering assembly of claim 6, wherein the tie rods and the sliding middle link extend along a common plane below an engine and/or a battery of the vehicle and wherein the tie rods and the sliding middle link slide along the second direction in the common plane as a single unit.

8. The steering assembly of claim 1, wherein the steering assembly is positioned adjacent a non-rigid drive axle having a wishbone suspension, wherein the steering assembly further includes a first kneecap substantially aligned with a pivot of the wishbone suspension.

9. A vehicle, comprising:
    a steering assembly, with a sliding middle link positioned between front wheels of the vehicle, the steering assembly configured to transfer rotational movement from a steering wheel of the vehicle to linear movement via a pitman arm, a drag link, a steering arm, a first wheel plate, a second wheel plate, tie rods, and the sliding middle link; and
    a suspension system coupled to the first wheel plate and the second wheel plate, wherein the sliding middle link has a set of outer components including an outer housing, clamps, and springs, and wherein the outer components enclose an inner rod and a first guide ring and a second guide ring of the sliding middle link.

10. The vehicle of claim 9, wherein the drag link is arranged perpendicular to the sliding middle link, extending along one side of the vehicle between the steering wheel and the first wheel plate, and wherein the drag link does not couple to the sliding middle link.

11. The vehicle of claim 9, wherein the inner rod is threaded through the first guide ring and the second guide ring and configured to slide through the first and second guide rings and wherein the first and second guide rings are each enclosed by one of the clamps.

12. The vehicle of claim 11, wherein the clamps and the enclosed first and second guide rings are fixedly attached to a vehicle chassis and wherein the inner rod moves relative to the vehicle chassis and the enclosed first and second guide rings do not move relative to the vehicle chassis.

13. The vehicle of claim 9, wherein the tie rods includes a first tie rod extending between a first end of the inner rod and the first wheel plate, the first tie rod coupled to the first end of the inner rod by a first kneecap and coupled to the first wheel plate by a first hinge, and wherein the tie rods includes a second tie rod extending between a second end of the inner rod, opposite of the first end, and the second wheel plate, the second tie rod coupled to the second end of the inner rod by a second kneecap and coupled to the second wheel plate by a second hinge.

14. The vehicle of claim 9, wherein the pitman arm is configured to rotate about an axis parallel with a width of the vehicle and wherein the rotation of the pitman arm is translated to linear motion of the drag link along a direction parallel with a length of the vehicle.

15. The vehicle of claim 14, wherein the drag link is coupled to the steering arm by a joint, the steering arm attached to the first wheel plate, and wherein the linear motion of the drag link is converted to turning of both the steering arm and the first wheel plate at the joint.

16. The vehicle of claim 15, wherein the turning of the first wheel plate compels sliding of the sliding middle link along a direction parallel with the width of the vehicle and wherein the sliding of the sliding middle link forces the second wheel plate to turn in unison with the first wheel plate.

17. The vehicle of claim 16, wherein the first wheel plate and the second wheel plate are each attached to front wheels of the vehicle and wherein the turning of the first wheel plate and the second wheel plate forces the front wheels to turn in unison with the first and second wheel plates.

18. The vehicle of claim 9, wherein the sliding middle link and the tie rods of the steering assembly are spaced away from and positioned vertically lower than an upper portion of the suspension system and wherein the suspension system is not coupled to the sliding middle link or tie rods and is configured as an independent double wishbone suspension system.

19. A steering system, comprising:
a steering wheel coupled to a steering assembly, the steering assembly including a first linkage assembly, extending along one side of a vehicle, and a second linkage assembly with a sliding middle link, the second linkage assembly extending perpendicular to the first linkage assembly between front wheels of the vehicle, wherein the steering assembly is configured to convert rotation of the steering wheel to linear motion along a first direction at the first linkage assembly and transfer the linear motion from the first linkage assembly to the second linkage assembly along a second direction, the second direction perpendicular to the first direction, wherein the sliding middle link has a set of outer components including an outer housing, clamps, and springs, and wherein the outer components enclose an inner rod and a first guide ring and a second guide ring of the sliding middle link.

20. The steering system of claim 19, wherein the second direction is a horizontal direction along a width of the vehicle and wherein the second linkage assembly moves only along the horizontal direction and not along a vertical or transverse direction.

\* \* \* \* \*